United States Patent
Kang et al.

(10) Patent No.: US 7,130,331 B2
(45) Date of Patent: Oct. 31, 2006

(54) METHOD AND APPARATUS FOR SEARCHING TIME-DIVISION MULTIPLEXED SYNCHRONIZATION SEQUENCES

(75) Inventors: Inyup Kang, San Diego, CA (US); Tao Li, San Diego, CA (US)

(73) Assignee: Qualcomm Incorporated, San Diego, CA (US)

( * ) Notice: Subject to any disclaimer, the term of this patent is extended or adjusted under 35 U.S.C. 154(b) by 904 days.

(21) Appl. No.: 09/872,848

(22) Filed: Jun. 1, 2001

(65) Prior Publication Data

US 2002/0181632 A1    Dec. 5, 2002

(51) Int. Cl.
*H04B 1/707* (2006.01)
(52) U.S. Cl. ...................................... 375/149
(58) Field of Classification Search ............... 375/140, 375/142, 143, 150, 152, 365, 368
See application file for complete search history.

(56) References Cited

U.S. PATENT DOCUMENTS 6,009,118 A * 12/1999 Tiemann et al. ............ 375/150
6,804,290 B1 * 10/2004 King et al. ................. 375/142

FOREIGN PATENT DOCUMENTS

EP    0930723    1/1999
EP    0944178    3/1999

* cited by examiner

*Primary Examiner*—Kevin Kim
(74) *Attorney, Agent, or Firm*—Philip R. Wadsworth; Charles P. Brown; George C. Poppas

(57) ABSTRACT

In a real-time mode, a clock signal of a searcher architecture is disabled between synchronization sequence bursts. In a sample storage or asynchronous mode, portions of stored signals do not belong to any hypothesis to be tested (e.g. portions that occur between synchronization signal bursts) are not loaded into the searcher delay chain.

10 Claims, 10 Drawing Sheets

METHOD AND APPARATUS FOR SEARCHING TIME-DIVISION MULTIPLEXED SYNCHRONIZATION SEQUENCES

BACKGROUND OF THE INVENTION

1. Field of the Invention

This invention relates to wireless communications. Specifically, this invention relates to processing of received signals.

2. Background Information

Pseudorandom noise (PN) sequences are commonly used in direct-sequence spread spectrum (DSSS) communications systems, such as those compliant with the IS-95 over-the-air interface standard and its derivatives such as IS-95-A and ANSI J-STD-008 (referred to hereafter collectively as the IS-95 standard) promulgated by the Telecommunications Industry Association (TIA) (Arlington, Va.) and used primarily within cellular telecommunications systems. An IS-95-compliant system uses code division multiple access (CDMA) signal modulation techniques to support multiple communications channels simultaneously over the same radio-frequency (RF) bandwidth. When combined with comprehensive power control, supporting multiple channels over the same bandwidth increases the total number of calls and other communications that can be conducted in a system for wireless communications by, for example, increasing the degree of frequency reuse in comparison to other wireless telecommunications technologies.

FIG. 1 provides a highly simplified illustration of a system for cellular telephony that is configured in accordance with practice of the IS-95 standard. During operation, a set of subscriber units 10A–D engage in wireless communications by establishing one or more RF interfaces with one or more base stations 12A–D using CDMA modulated RF signals. Each RF interface between a base station 12 and a subscriber unit 10 includes a forward link signal transmitted by the base station 12 and a reverse link signal transmitted by the subscriber unit. Using these RF interfaces, a communication with another user is generally conducted by way of a mobile telephone switching office (MTSO) 14 and the public switched telephone network (PSTN) 16. The links between base stations 12, MTSO 14 and PSTN 16 are usually carried using wireline connections, although the use of additional RF or microwave links is also known.

Each subscriber unit 10 uses a rake receiver to receive communications from one or more base stations 12. A rake receiver typically includes one or more searchers for locating direct and multipath instances of pilot signals from nearby base stations, and two or more fingers for receiving and combining information signals from those base stations. For example, a description of a rake receiver may be found in U.S. Pat. No. 5,109,390, entitled "DIVERSITY RECEIVER IN A CDMA CELLULAR TELEPHONE SYSTEM", assigned to the assignee of the present invention, and searchers are described in co-pending U.S. patent application Ser. No. 08/316,177, entitled "MULTIPATH SEARCH PROCESSOR FOR SPREAD SPECTRUM MULTIPLE ACCESS COMMUNICATION SYSTEMS", filed Sep. 30, 1994 and assigned to the assignee of the present invention.

In an IS-95-compliant communications system, the pilot signals are implemented as signals that have PN sequences but carry no data and have constant power over time. A pilot signal that accompanies an information signal may be used by the receiver as a phase reference to support coherent demodulation of phase-shift keying (PSK) modulation schemes such as binary and quadrature PSK (BPSK and QPSK, respectively). Pilot signals are also useful as indications of received signal strength for power control and handoff operations.

In an IS-95-compliant system, a base station differentiates its pilot signal from those of nearby base stations by inserting a unique offset (specifically, an integer multiple of 64 chips) in the generation of its PN sequences. A subscriber unit communicates with a base station by assigning at least one finger to that base station. In order to distinguish the assigned pilot signal, a finger must use the same PN sequence and insert the appropriate offset. It is also possible for base stations to differentiate their pilot signals by using unique PN sequences rather than offsets of the same PN sequence. In this case, a finger would adjust its PN generator to produce the appropriate PN sequence for the base station to which it is assigned.

FIG. 2 shows an architecture for a matched filter searcher suitable for pilot signal searching. Antenna 30 receives a signal that includes pilot signal transmissions from one or more base stations. Receiver 31 downconverts, amplifies, and samples the signal, generating sampled in-phase (I) and quadrature (Q) components of the received signal and delivering the two components to delay chains 36 and 38, respectively. Each delay chain contains N delay elements (labeled $D_{I1}$–$D_{IN}$ and $D_{Q1}$–$D_{QN}$). The output of each delay element is multiplied by a corresponding value of the PN sequences loaded into I and Q tap value chains 35 and 37. The PN sequences are created with I and Q PN generators, and the PN values are loaded or hard coded into the multiplication elements (labeled $PN_{I1}$–$P_{IN}$ and $PN_{Q1}$–$PN_{QN}$) of the tap value chains. Note that in the simple case, the PN values include only +1 and −1, so that inverters (or negaters) may be used in the multiplication elements in place of actual multipliers.

The results of the N multiplications for the I and Q components are delivered to adders 34 and 32, respectively, where they are summed for each component to produce a complex correlation result for that particular alignment of the PN sequence with the received signal (also called a 'code phase hypothesis' or simply 'hypothesis'). The two real components of the complex correlation result are squared and summed in block 33 to produce an energy result which is compared with a predetermined threshold in threshold compare 39. A high-valued energy result indicates a likelihood that the hypothesis is correct, i.e. that a pilot signal was received which has that particular alignment with the portion of the PN sequences contained in the tap elements. As later received samples are shifted into delay chains 36 and 38, an energy result is calculated for each of the corresponding hypotheses.

One alternative to a pilot signal that has constant power over time is a burst pilot signal whose power is gated over time. Examples of systems that have a burst pilot channel structure include those compliant with the IS-856 standard (published by TIA and also known as 'cdma2000 High Rate Packet Data Air Interface Specification'). In an IS-856-compliant system, for example, the burst pilot signal is time-division multiplexed onto a channel that may also carry control and/or traffic data (i.e. at other times). FIG. 3 illustrates the structure of an IS-856 burst pilot signal, which includes a 96-chip pilot burst in the middle of every half slot (1024 chips). Other examples of discontinuous synchronization mechanisms include the Primary Synchronization Code (PSC) transmitted in the first 256 chips of each slot of the Primary Synchronization Channel in a system compliant with the W-CDMA standard (as described in, e.g., section 5.1 of ITU-R M.1457, 'Detailed specifications of the radio interfaces of International Mobile Telecommunication-2000 (IMT-2000),' published by International Telecommunications Union, Geneva, Switzerland) and other W-CDMA time-division multiplexed synchronization mechanisms such as frame timing and burst pilot sequences.

It is desirable to perform acquisition and tracking of time-multiplexed synchronization sequences such as those mentioned above in an efficient manner. For example, it is desirable to realize efficiencies with respect to considerations such as processing time, processing cycles, storage space, flexibility, and programmability. Unfortunately, existing architectures are not suited to perform such operations on time-multiplexed synchronization sequences in an efficient manner.

SUMMARY

A searcher according to one embodiment of the invention allows operations such as acquisition and tracking of time-division multiplexed synchronization sequences to be performed efficiently by selectively enabling and disabling a searcher clock signal. A searcher according to another embodiment of the invention allows unnecessary retrieval operations to be avoided by not retrieving received samples from storage that do not correspond to a search hypothesis to be tested. Further implementations of such searchers also allow multiple hypotheses to be tested on a single sample vector and/or allow hypotheses relating to multiple code signals to be tested contemporaneously.

DETAILED DESCRIPTION

Figure 1:
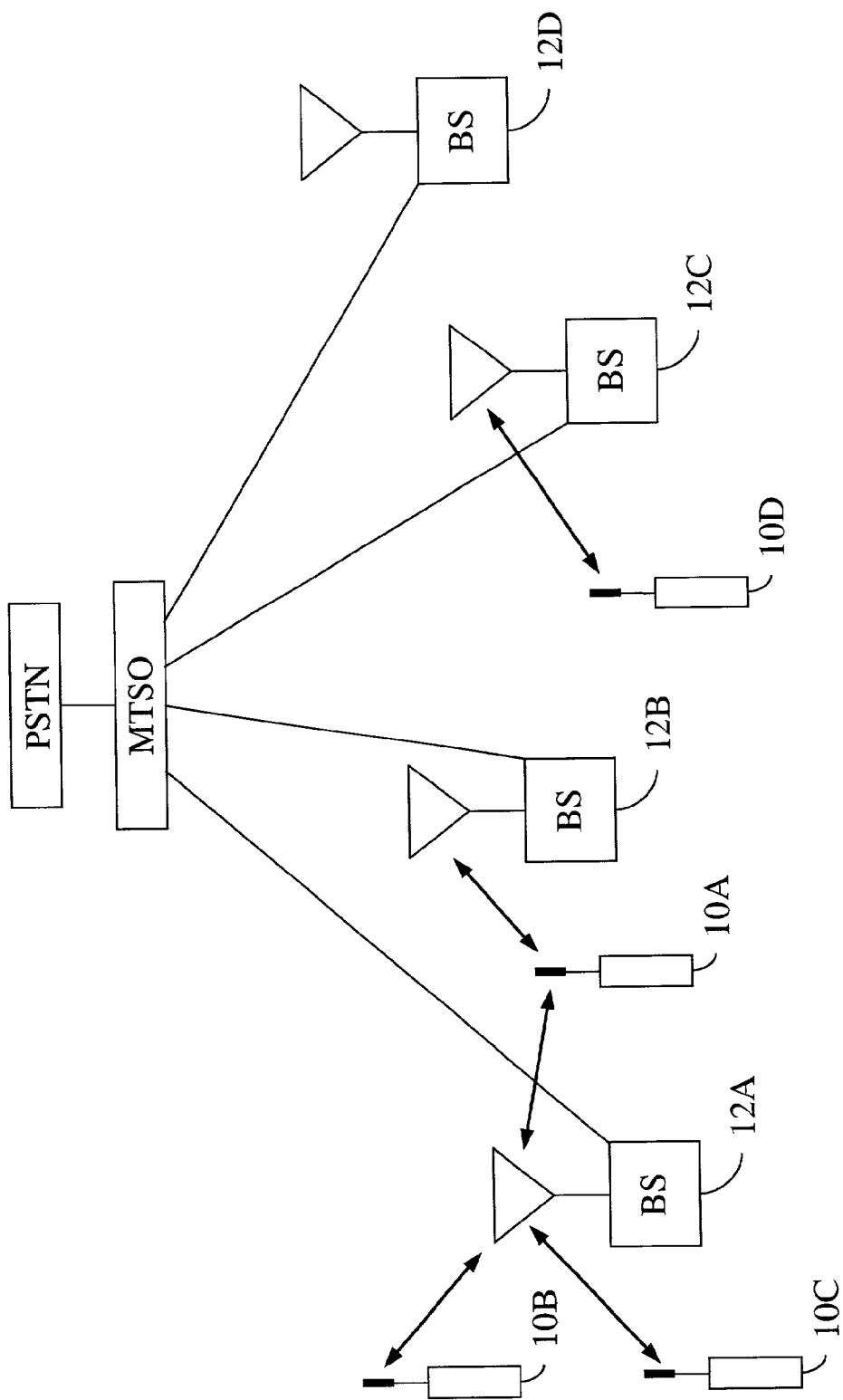
FIG. 1 shows a block diagram of a cellular telephone system.
Figure 2:
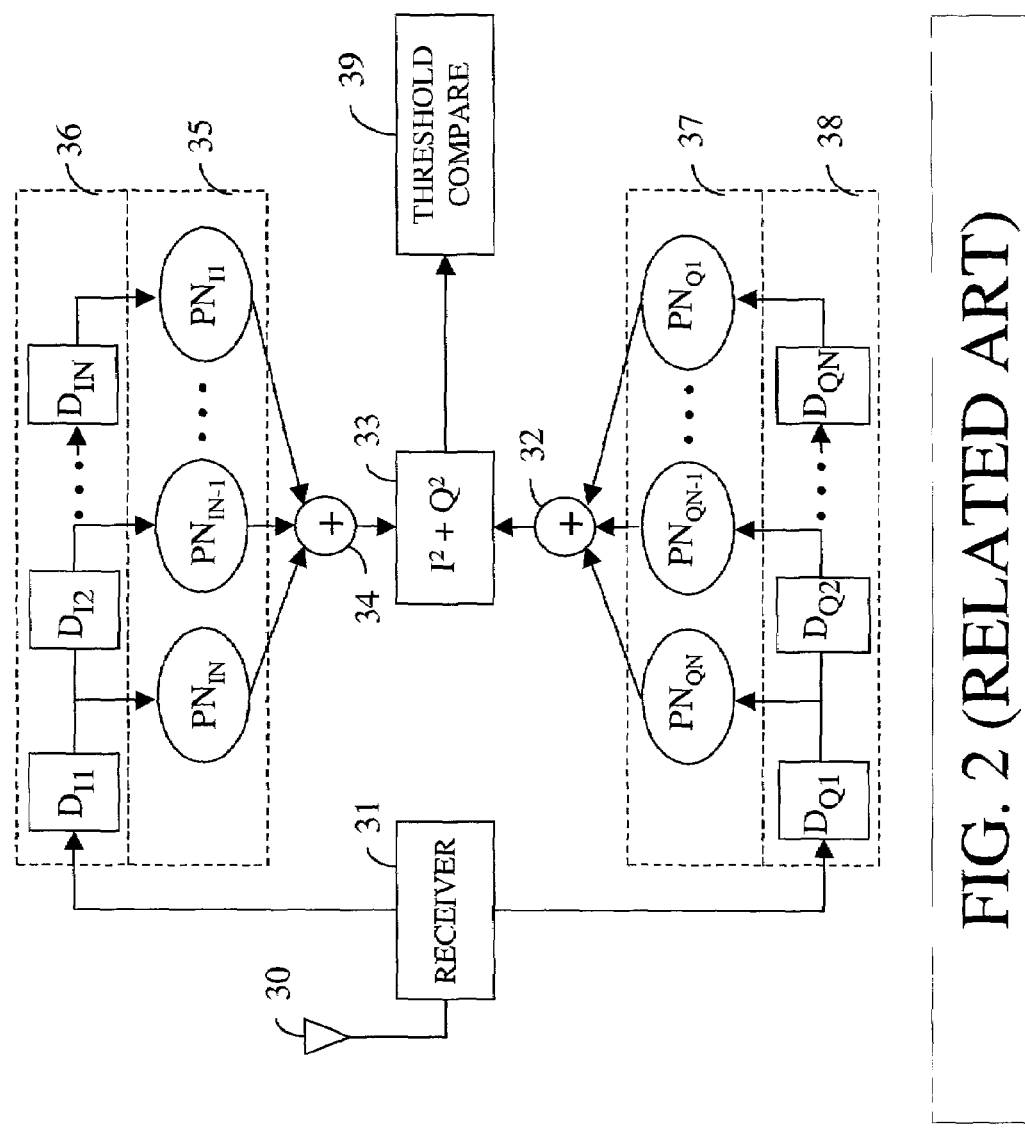
FIG. 2 shows a block diagram of an architecture for a matched filter searcher.
Figure 3:
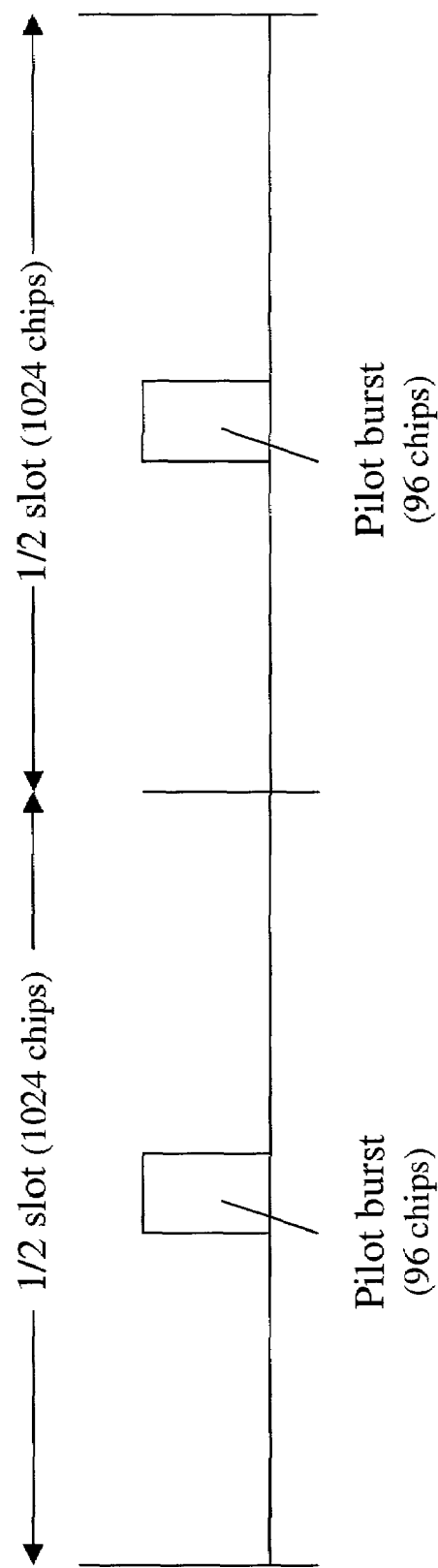
FIG. 3 shows a burst pilot signal according to the IS-856 standard.
Figure 4:
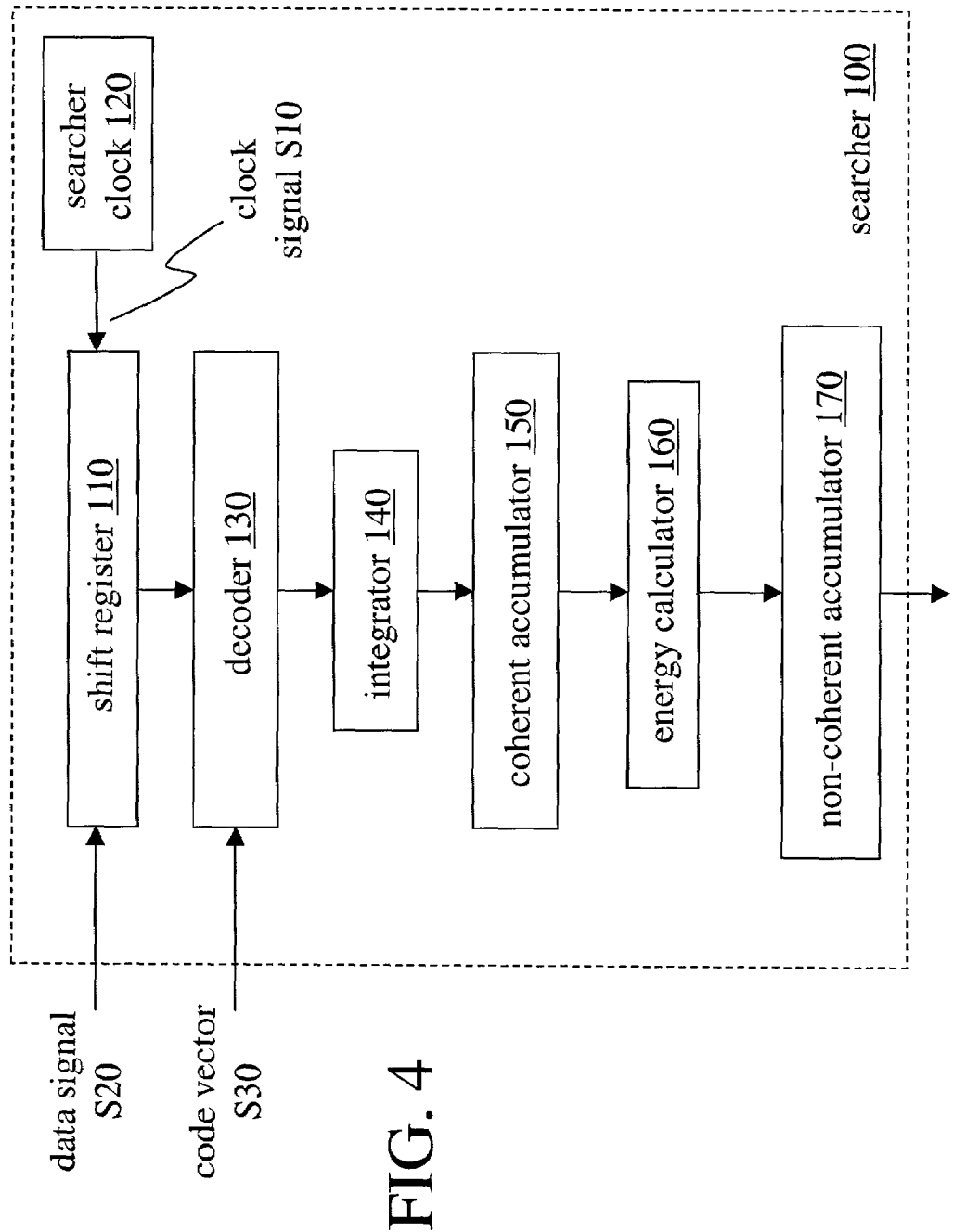
FIG. 4 shows a block diagram of an architecture for a searcher according to an embodiment of the invention.

FIG. 4 shows a block diagram of a searcher 100 according to an embodiment of the invention. Samples received over data signal S20 are shifted into an M-element delay chain according to a clock signal S10 from searcher clock 120. In this example, the delay chain is implemented with a shift register 110 which has M complex-valued taps, each component of each tap having 4 bits of resolution, although any other number of taps and resolution may be chosen. The contents of shift register 110 represent the current hypothesis vector, which changes at every transition of clock signal S10 (a transition being designated as, e.g., the rising and/or trailing edge of a pulse on clock signal S10).

In a real-time searching application, the received samples may be supplied at a constant rate (e.g. by an RF receiving and sampling subsystem). Depending on parameters such as sampling rate and number of antennas, clock signal S10 may transition at the chip rate (i.e. chip×1) or at a higher rate such as chip×2, chip×4, or chip×8. In an asynchronous searching application, clock signal S10 may transition at an arbitrary rate to load samples into shift register 110 from a sample storage such as a random-access memory (RAM).

Figure 5A:
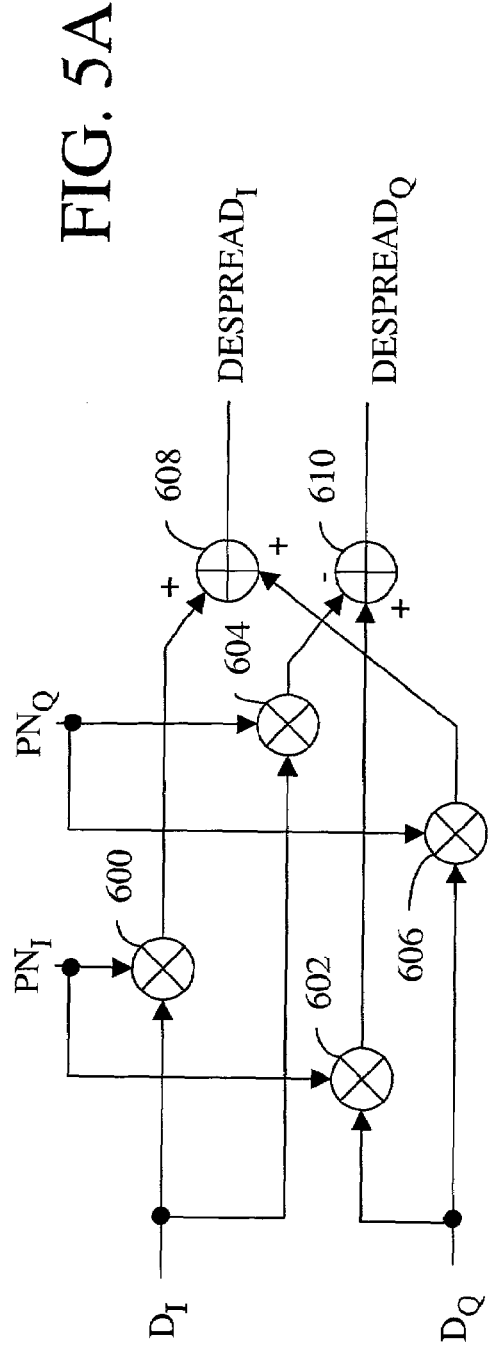
FIGS. 5A and 5B show block diagrams of despreader elements suitable for use in implementations of despreader 130.
Figure 5B:
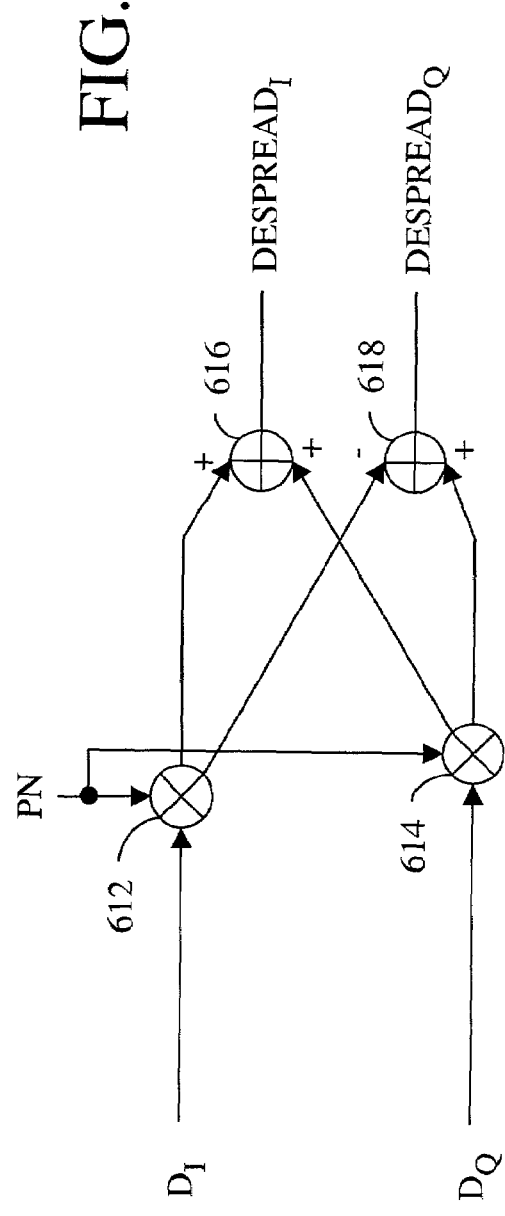

Decoder 130 decodes the current M-element hypothesis vector according to a predetermined code vector S30 to produce a product vector. For QPSK modulation, code vector S30 is an M-element complex PN sequence, and the hypothesis and product vectors are M-element complex vectors. In this case, decoder 130 may include M instances of a despreader element as shown in FIG. 5A, the M instances operating in parallel on respective pairs of hypothesis and code vector elements (labeled $D_I$, $D_Q$ and $PN_I$, $PN_Q$, respectively) to produce the elements of the product vector (labeled $DESPREAD_I$, $DESPREAD_Q$). For BPSK modulation, decoder 130 may include M instances of a despreader element as shown in FIG. 5B instead, where code vector S30 is an M-element real PN sequence. The code may be supplied to decoder 130 from storage or from a code generator such as a PN generator.

In an cdma2000-compliant system, Walsh codes or quasi-orthogonal functions (QOFs) are used to provide orthogonal channelization. In a further implementation of searcher 100, it may be desirable for decoder 130 to perform removal of channelization codes (also called 'decovering') as well as QPSK despreading. In a particular example, decoder 130 decodes a signal that has been encoded according to the following expression:

$$Y = (X_I + jX_Q) \times (-1)^{(WALSH_{CH} \oplus QOF_{SIGN})} \times j^{WALSH_{ROT}} \times (PN_I + jPN_Q)$$

where Y indicates the received signal, j indicates the square root of −1, $(X_I+jX_Q)$ indicates the data vector, $(PN_I+jPN_Q)$ indicates the PN code vector, $WALSH_{CH}$ indicates the Walsh channelization code, $QOF_{SIGN}$ indicates a real mask vector that is applied to the Walsh code, and $WALSH_{ROT}$ indicates a Walsh code used to enable or disable rotation by 90 degrees. Decoder 130 may be constructed in various different forms to perform such an operation.

Figure 6:
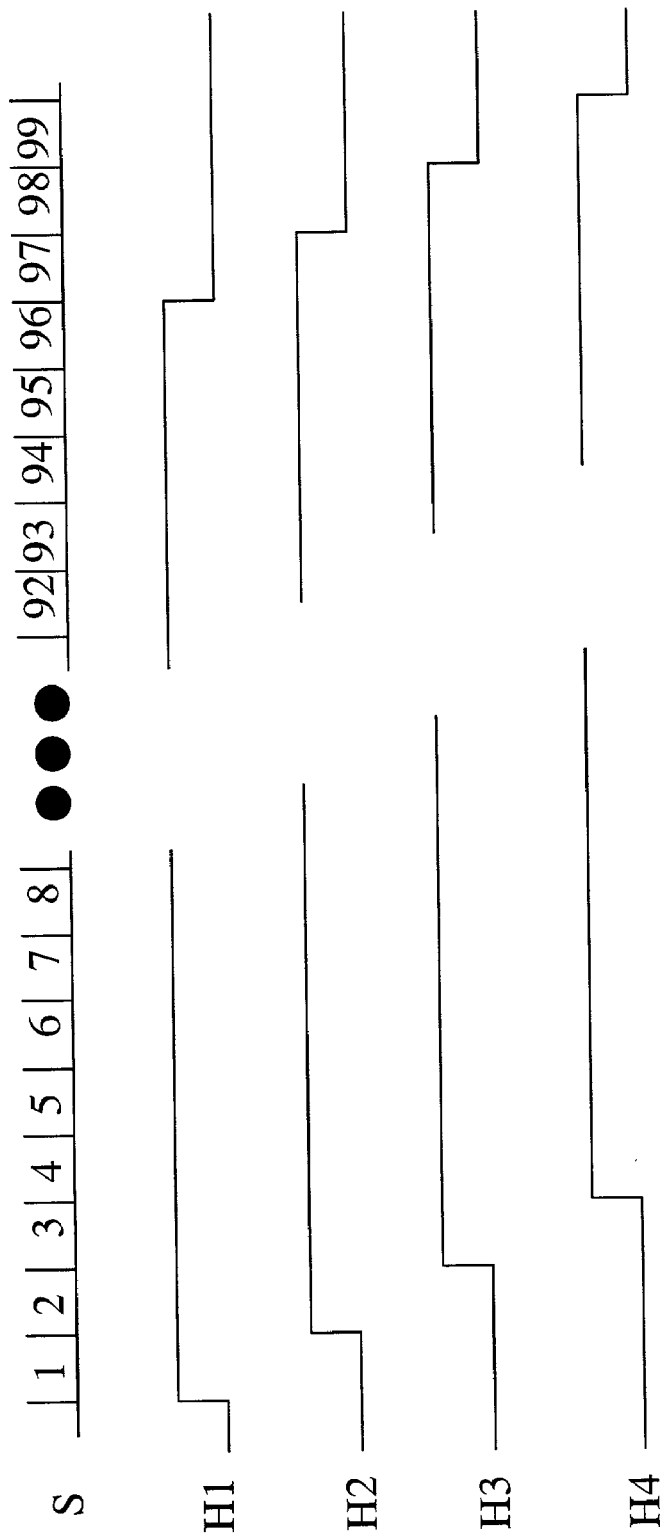
FIG. 6 illustrates a correspondence between a string of received samples and several hypotheses.

To illustrate one example of a field of use for searcher 100, FIG. 6 shows the beginning and end of a 99-sample portion S of a string of received samples. In this example, the string is sampled at a rate of chip×1, although it may be desired to use a higher sampling rate in practice. Hypothesis H1 is the hypothesis that the string contains the 96-chip sequence being searched (e.g. a burst of an IS-856 pilot signal) at samples 1–96, hypothesis H2 is the hypothesis that the string contains the target sequence at samples 2–97, and so on. Changing from one hypothesis to the next may be achieved by holding the code vector (or vectors) inputted to decoder 130 constant while shifting the next sample into shift register 110, or alternatively by holding the contents of shift register 110 constant while shifting the code vector(s) to the next position in the code sequence.

Figure 7:
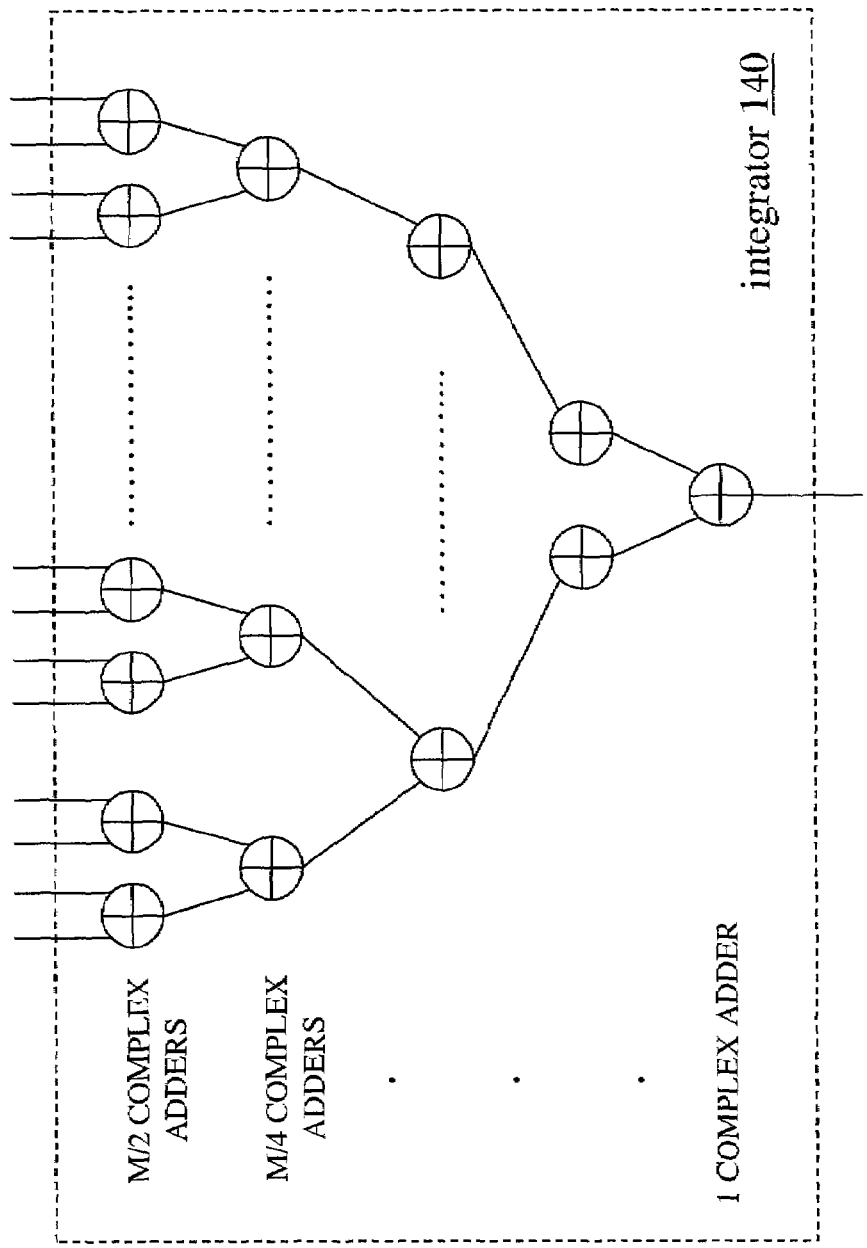
FIG. 7 illustrates an exemplary application of an integrator according to an embodiment of the invention.

Integrator 140 receives the product vector from decoder 130 and outputs a correlation result for the current hypothesis vector. For example, the correlation result may be a complex number representing the sum of the elements of the product vector. FIG. 7 shows an exemplary implementation of integrator 140 as a tree of complex adders. In other implementations, integrator 140 may be constructed as two parallel trees of real adders or as a single tree of real adders that operates on the two components of the complex result serially. The magnitude of the correlation result may be taken as a measure of the likelihood that the hypothesis is correct.

An optional mask may also be applied upstream of or even within integrator 140 to zero out selected values or groups of values as described in the copending U.S. patent application Ser. No. 09/283,010, filed Mar. 31, 1999 and entitled "PROGRAMMABLE MATCHED FILTER SEARCHER." An optional phase rotator may also be applied at the output of integrator 140 to support searching of more than one frequency on a phase offset hypothesis (as described in the above reference application Ser. No. 09/283,010).

It may be desired to coherently integrate a hypothesis over a sequence longer than M samples. If the received RF signal has a substantially constant phase over a string of (C×M) consecutive samples, then a higher signal-to-noise ratio (SNR) may be achieved by testing the same code phase hypothesis on each of C consecutive M-element sample vectors (e.g. by adjusting the I and Q PN sequences to have the same alignment with each sample vector) and accumulating the C correlation results for that hypothesis. Therefore, it may be desired to coherently integrate a hypothesis over a sequence of 96 samples (e.g. one IS-856 pilot burst sampled at chip×1) using a shift register 110 having a width M that is less than 96.

Coherent accumulator 150 receives C correlation results for a single hypothesis and accumulates them to produce a coherent sum. In an exemplary implementation, coherent accumulator 150 has the capacity to accumulate M separate coherent sums (e.g. corresponding to M consecutive hypotheses) at a time, although in other implementations the capacity P of coherent accumulator 150 may be greater or less than M.

In an exemplary application of searcher 100, each of the M hypotheses is obtained by holding the code vector(s) constant while shifting the next sample into shift register 110. After M shifts, the code vector(s) are advanced by M samples at once, additional correlation results are obtained for the same set of M hypotheses, and these M results are accumulated with the previous set by coherent accumulator 150. When C correlation results have been accumulated for each hypothesis, searcher clock 120 disables clock signal S10 (e.g. prevents further transitions on clock signal S10) until the next synchronization sequence burst arrives.

Energy calculator 160 calculates a measure of the magnitude of a complex coherent sum as accumulated by coherent accumulator 150. In an exemplary implementation, energy calculator 160 calculates the magnitude measure as the real sum of the squares of the complex coherent sum's real and imaginary components.

Figure 8:
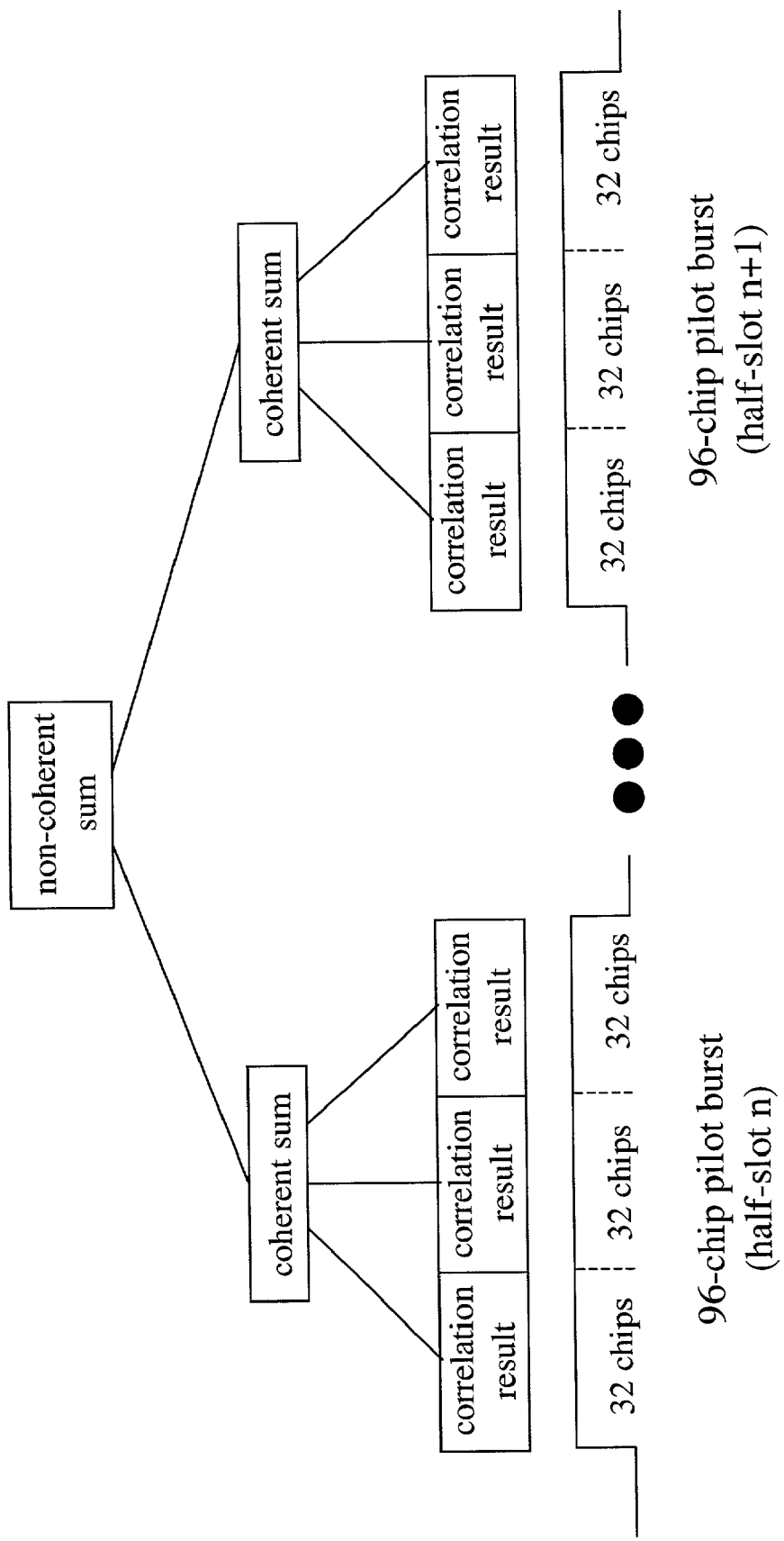
FIG. 8 illustrates combining energy results into a single non-coherent sum.

A higher SNR may be achieved for a given hypothesis even over a period of nonconstant RF phase by combining the energy results obtained over individual periods of substantially constant phase into a single noncoherent sum. FIG. 8 illustrates an example in which this principle is applied to combine the energy results from two different 96-chip pilot bursts. Non-coherent accumulator 170 receives N magnitude measures that correspond to the same hypothesis on each of the different bursts and accumulates them to produce a noncoherent sum (in the example of FIG. 8, M=32, C=3, and N=2). In an exemplary implementation, noncoherent accumulator 170 has the capacity to accumulate M separate noncoherent sums (e.g. corresponding to M consecutive hypotheses) at a time, although in other implementations the capacity Q of noncoherent accumulator 170 may be greater or less than M. The magnitude of the noncoherent sum may be taken as a measure of the likelihood that the corresponding hypothesis is correct.

In other implementations of searcher 100, additional processing may be performed as described in the co-pending U.S. patent application Ser. No. 09/283,010 referenced above. For example, a peak detector may be used to suppress energy values (such as noncoherent sums) that are above a preselected threshold and within a preselected distance (e.g. one-half chip) of an energy peak (defined, e.g., as an energy value that is above a threshold and greater than its neighbors). The offsets corresponding to a predetermined number of peaks may also be sorted according to the energy values of the peaks and stored in a sorting queue. Further processing operations are also possible.

It should be noted that if integrator 140 outputs at least one correlation result for each transition of searcher clock 120, and either or both of P and Q are less than M, then some of the information outputted by integrator 140 regarding the tested hypotheses may be lost. Therefore, in many applications it may be desirable to choose P and Q to be as least as large as M. In conjunction with an operation such as decoding multiple code hypotheses for each sample vector in shift register 110, for example, P and/or Q may be chosen to be larger than M to enable the accumulation of results from more than one hypothesis on each sample vector.

In an exemplary implementation of searcher 100 as applied to the example of FIG. 8, after the last vector for the last hypothesis has been loaded into shift register 110 for half-slot n, searcher clock 120 disables clock signal S10 until it is time to begin loading the first vector for the first hypothesis for half-slot (n+1). By calculating the portion of each 1024-chip half-slot during which clock signal S10 is active as $$[M \times (C+1)/1024],$$

we see that clock signal S10 is active in this example during only 12% of each slot. For a searcher architecture fabricated in a process characterized by a low quiescent current draw (such as complementary metal-oxide-semiconductor or 'CMOS'), a significant power savings may be realized by disabling the searcher clock signal between synchronization signal bursts.

In addition to M, C, N, P, and Q, other parameters of a searcher architecture include the number of hypotheses L and the size of the search window W. In an application to an IS-856-compliant system, L is limited in practice to the number of samples that separate the first hypothesis for each burst (or 1024 for a sampling rate of chip×1). The values of L and W may be limited by the structural parameters M, C, N, P, and Q, and the values of these structural parameters may therefore be selected according to the desired values of L and W and/or other design considerations such as availability of chip area for features such as storage elements and data busses.

In the search illustrated in FIG. 8, for example, assuming that the sizes of the coherent and non-coherent accumulators P and Q are both equal to M, then the search window size W is equal to 32 and L is equal to 320. Specifically, up to 320 (of 1024 possible) hypotheses may be searched in the groups (1–32), (97–128), (193–224) and so on, according to the formula $$[(i \times 96)+1] \text{ to } [(i \times 96)+32], \ 0 <= i <= 10.$$

It may be desirable to use different values of L and/or W depending on whether an initial acquisition or a tracking of the pilot signal is being performed.

In other implementations of a searcher according to an embodiment of the invention, data signal S20 may be preprocessed before its values are shifted into shift register 110. For example, a received signal may be sampled at a high rate (e.g. chip×8), and adjacent samples may be averaged or otherwise combined to reduce the sample rate (e.g. to chip×2 or chip×1) before the data signal is shifted into shift register 110. Likewise, data signal S20 may be amplified and/or rotated (e.g. to remove a frequency offset) before its values are shifted into shift register 110.

Figure 9:
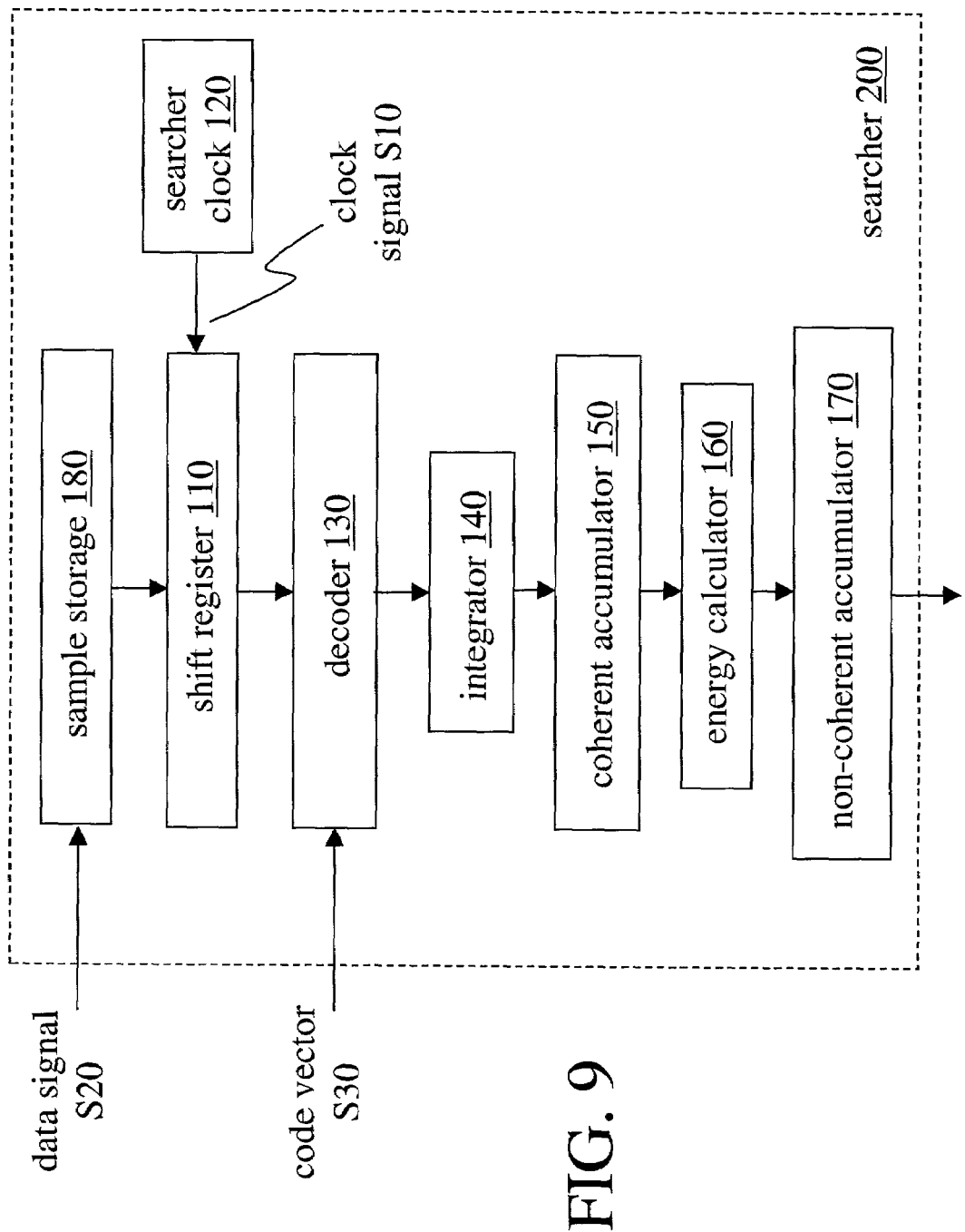
FIG. 9 shows a block diagram of an architecture for a searcher according to another embodiment of the invention.

FIG. 9 shows a block diagram of a searcher 200 according to an embodiment of the invention in which received samples are shifted into shift register 110 from sample storage 180. In an asynchronous application of such a searcher, clock signal S10 may transition at an arbitrary rate, e.g. to allow a data processing rate that exceeds the rate of data arrival on data signal S10.

In one example, the sample rate of data stored in sample storage 180 is the same as the sample rate of data shifted into shift register 110. In another example, data is stored in sample storage 180 at a higher sample rate, and adjacent samples are averaged or otherwise combined (e.g. using a subsampler) to reduce the sample rate before the data is shifted into shift register 110. Selection of which samples to load from sample storage 180 to shift register 100 may be performed by a counter (e.g. for cyclic control) and/or by a processor (e.g. for generating an acyclic count or for resetting or otherwise modifying a counter output) used, e.g., to address specific storage locations of sample storage 180.

It may be desirable not to load samples into shift register 110 that do not affect any search hypothesis to be tested. With reference to the example of FIG. 6, if only the 96-sample hypotheses H1–H32 are to be searched, then it may be desirable to retrieve only the samples 1–127 [127=96+(32−1)] for each half-slot from sample storage 180, as the other samples for the half-slot do not belong to any sample vector to be tested.

In an asynchronous application of a searcher as shown in FIG. 9, it may be desirable to store a string of samples in sample storage 180 that is long enough to support calculation of the desired number of hypotheses and/or accumulation of the desired number of correlation results for each hypothesis. In performing a search according to FIG. 8, for example, it may be desirable to store a string that includes two complete bursts to support accumulation of noncoherent sums for N=2. In an IS-856 application, for example, it may be desirable for sample storage 180 to have a capacity close to 2144 chips, as a string that corresponds to 2144 consecutive chips will contain at least two complete 96-chip bursts.

In a searcher according to a further embodiment of the invention, multiple search hypotheses may be tested on each sample vector outputted by shift register 110. In such a case, several different code signals (or several different portions of the same code signal) may be selected for sequential input to decoder 130 to support contemporaneous, sequential calculation of multiple correlation results for the same sample vector. Similarly, several different phase rotations may be selected for sequential input to a phase rotator (e.g. at the output of integrator 140 as described above).

Suitable structures for coherent and noncoherent accumulators that accumulate test results relating to multiple search hypotheses (four different hypotheses in the example shown) for a single sample vector are described in, e.g., the above-referenced application Ser. No. 09/283,010. It may also be desirable to coordinate selection of code signals and phase rotations with accumulation of the corresponding coherent and noncoherent sums. In such case, one or more signals to provide such coordination may be supplied to the various units by an oscillator (for cyclic control) and/or by a processor (for acyclic control and/or to directly provide selection parameters such as code signals or phase rotations).

Figure 10:
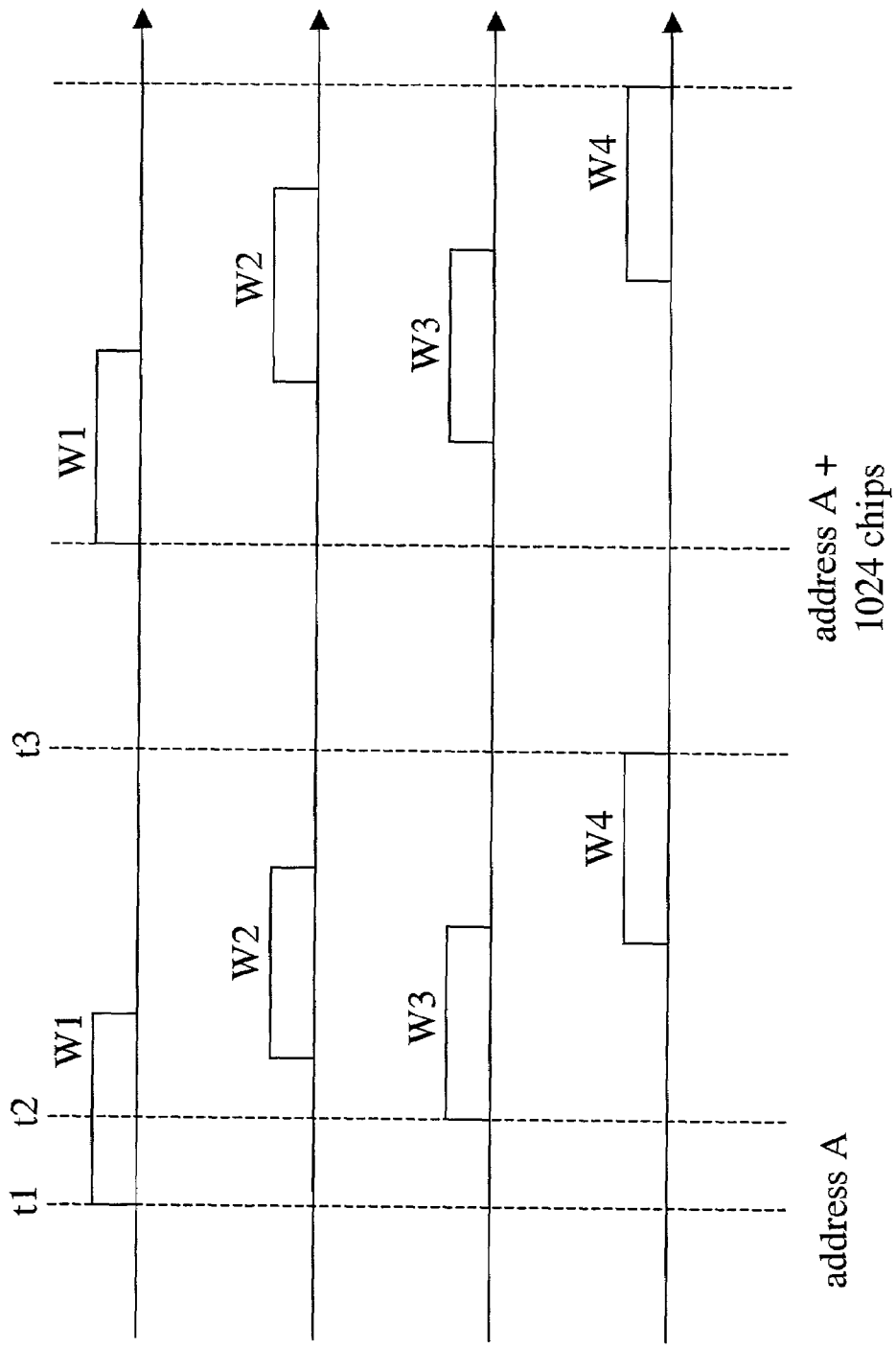
FIG. 10 shows an example of contemporaneously searching several hypotheses.

FIG. 10 shows an example of contemporaneously searching several hypotheses that may relate to different code signals S30. At time t1, testing of hypotheses relating to a first code signal S30a within a search window W1 commences. (In one example of an asynchronous application of a searcher having a sample storage 180, loading of samples into shift register 110 begins at a selected address A of sample storage 180.) In an example of a searcher having the capacity to search and accumulate results for four hypotheses at a time, only 25% of the searcher's capacity is currently used. The searcher continues to test hypotheses relating to the first code signal S30a through time t2, when testing of hypotheses relating to a third code signal S30c within search window W3 begins and the searcher utilization increases to 50%. The searcher utilization increases to 75% for a time when testing of hypotheses relating to a second code signal S30b in search window W2 commences and until the end of search window W1 is reached. At time t3, testing of hypotheses relating to a fourth code signal S30d within a search window W4 ends.

In a real-time application, the searcher utilization may remain at 0% from time t3 until the next occurrence of search window W1. In a method of asynchronous searching according to one embodiment of the invention, however, samples between search window W4 and the next occurrence of search window W1 are not loaded into shift register 110. Instead, loading of samples into shift register 110 advances at time t3 to the address of sample storage 180 where the next occurrence of search window W1 begins: in this example, 1024 chips (one IS-856 half-slot) greater than address A. Although the worst-case scenario for such a method in this example is 25% searcher utilization (i.e. when none of the search windows W1–W4 overlap), such a result is still more efficient overall than a real-time searching application, and the best-case result (when all of the search windows overlap) is 100% searcher utilization.

In an alternate implementation, the searcher may be adapted and configured to to store I, Q PN sequences in memory instead of generating them in real time. By fetching PN sequences from memory directly, a PN position can be determined immediately without waiting for slewing, which a real time PN generator normally does.

The foregoing presentation of the described embodiments is provided to enable any person skilled in the art to make or use the present invention. Various modifications to these embodiments are possible, and the generic principles presented herein may be applied to other embodiments as well. For example, the invention may be implemented in part or in whole as a hard-wired circuit, as a circuit configuration fabricated into an application-specific integrated circuit, or as a firmware program loaded into non-volatile storage or a software program loaded from or into a data storage medium as machine-readable code, such code being instructions executable by an array of logic elements such as a microprocessor or other digital signal processing unit. Thus, the present invention is not intended to be limited to the embodiments shown above but rather is to be accorded the widest scope consistent with the principles and novel features disclosed in any fashion herein.

What is claimed is:

1. A method of searching for a synchronization sequence transmitted in bursts, comprising:
   shifting a first string of samples of a first received signal burst into a shift register according to a clock signal;
   subsequent to the shifting the first string, disabling the clock signal;
   calculating a first correlation result based on at least a first substring of the first string of samples;
   calculating a second correlation result based on at least a second substring of the first string of samples;
   subsequent to the disabling the clock signal, enabling the clock signal;
   subsequent to the enabling the clock signal, shifting a second string of samples of a second received signal burst into the shift register according to the clock signal;
   calculating a third correlation result based on at least a first substring of the second string of samples;
   calculating a fourth correlation result based on at least a second substring of the second string of samples;
   calculating a first coherent sum based on the first correlation result and the second correlation result; and
   calculating a second coherent sum based on the third correlation result and the fourth correlation result,
   wherein the noncoherent sum is based on the first coherent sum and the second coherent sum.

2. The method of claim 1, wherein the first correlation result is based at least in part on a relation between a corresponding portion of a code vector and at least the first substring of the first string of samples, and
   wherein the second correlation result is based at least in part on a relation between a corresponding portion of the code vector and at least the second substring of the first string of samples, and
   wherein the portion of the code vector corresponding to the first correlation result is adjacent to the portion of the code vector corresponding to the second correlation result.

3. The method of claim 1, wherein each of the first, second, third, and fourth correlation results is based on testing a first search hypothesis.

4. A searcher comprising:
   a searcher clock configured and arranged to enable and disable a clock signal;
   a shift register configured and arranged to receive strings of samples of a received signal according to the clock signal and to output different sample vectors at successive transitions of the clock signal; and
   a noncoherent accumulator configured and arranged to output a noncoherent sum;
   a coherent accumulator configured and arranged to produce a first coherent sum based on a plurality of sample vectors outputted before a disabling of the clock signal and a second coherent sum based on a plurality of sample vectors outputted after the disabling of the clock signal, the noncoherent accumulator being configured and arranged to output the noncoherent sum based on the first coherent sum and the second coherent sum; and
   an integrator configured and arranged to produce a first correlation result corresponding to a first search hypothesis and based on the first sample vector, a second correlation result corresponding to a second search hypothesis and based on the second sample vector, a third correlation result based on a third sample vector outputted before a disabling of the clock signal, and a fourth correlation result based on a fourth sample vector outputted after the disabling of the clock signal, the third correlation result corresponding to the first search hypothesis and the fourth correlation result corresponding to the second search hypothesis, and the noncoherent accumulator being configured and arranged to output a noncoherent sum based on the first, second, third, and fourth correlation results.

5. The searcher of claim 4 the searcher further comprising a coherent accumulator configured and arranged to produce a first coherent sum based on the first and third correlation results and a second coherent sum based on the second and fourth correlation results, the noncoherent accumulator being configured and arranged to output a noncoherent sum based on the first coherent sum and the second coherent sum.

6. A method of searching for a synchronization sequence, comprising:
   storing a first string of samples to a sample storage, the first string including a first region, a second region, and an intermediate region between the first and second regions;
   loading samples of the first region into a shift register;
   testing a search hypothesis on a first sample vector outputted by the shift register and including samples of the first region;
   loading samples of the second region into the shift register;
   testing the search hypothesis on a second sample vector outputted by the shift register and including samples of the second region; and
   storing a second string of samples to the sample storage, including overwriting at least a portion of the intermediate region, no samples of the portion of the intermediate region being shifted into the shift register between a time of storing the first string and a time of storing the second string.

7. The method of claim 6, further comprising:
   receiving a radio-frequency signal over a first period; and
   receiving the radio-frequency signal over a second period subsequent to the first period, the first string of samples being based on the signal received over the first period and the second string of samples being based on the signal received over the second period.

8. The method of claim 6, further comprising:
   accumulating a noncoherent sum based on a result of testing the search hypothesis on the first sample vector and a result of testing the search hypothesis on the second sample vector.

9. The method of claim 6, further comprising:
   testing the search hypothesis on a third sample vector outputted by the shift register and including samples of the first region; and
   accumulating a coherent sum based on a result of testing the search hypothesis on the first sample vector and a result of testing the search hypothesis on the third sample vector.

10. The method of claim 6, further comprising:
    testing the search hypothesis on a third sample vector outputted by the shift register and including samples of the first region;
    testing the search hypothesis on a fourth sample vector outputted by the shift register and including samples of the second region;
    accumulating a first coherent sum based on a result of testing the search hypothesis on the first sample vector and a result of testing the search hypothesis on the third sample vector;

accumulating a second coherent sum based on a result of testing the search hypothesis on the second sample vector and a result of testing the search hypothesis on the fourth sample vector; and accumulating a noncoherent sum based on the first coherent sum and the second coherent sum.

* * * * *